United States Patent

[11] 3,628,620

[72] Inventor Robert H. Byers
 P.O. Box 124, West Point, Ind. 47992
[21] Appl. No. 850,936
[22] Filed Aug. 18, 1969
[45] Patented Dec. 21, 1971

[54] STROLLER MOVER
 2 Claims, 4 Drawing Figs.

[52] U.S. Cl. .................................................. 180/1 D, 5/109
[51] Int. Cl. .................................................. B62b 9/22
[50] Field of Search .................................................. 180/1 D; 5/108, 109; 280/36 B; 74/16

[56] References Cited
 UNITED STATES PATENTS

| | | | |
|---|---|---|---|
| 1,924,493 | 9/1933 | Grunkemeyer | 180/1 D |
| 1,999,957 | 4/1935 | Chlupsa | 180/1 D |
| 2,539,336 | 1/1951 | Sobers | 280/DIG. 6 |
| 2,632,517 | 3/1953 | Fraunfelder et al. | 180/1.3 |
| 2,685,435 | 8/1954 | Moore | 74/16 UX |
| 2,823,043 | 2/1958 | Shone | 280/36 B |

FOREIGN PATENTS

| 128,875 | 11/1928 | Switzerland | 180/180 D |

Primary Examiner—A. Harry Levy
Attorney—Woodard, Weikart, Emhardt and Naughton

ABSTRACT: A portable baby rocking device for use in combination with a stroller to move the stroller back and forth. The stroller is placed on the outside flat surface of a portable housing which has adjustable tracks for guiding the wheels of the stroller. A gear-reduction-type motor is mounted on the housing and has a removable disc secured thereto. A link extends between and connects the disc and a stroller and is readily detachable from both. The disc and the link can be stored in the housing when not in use.

PATENTED DEC 21 1971

3,628,620

INVENTOR
ROBERT H. BYERS
BY
Woodard Weikart Emhardt & Naughton
ATTORNEYS

STROLLER MOVER

BACKGROUND OF THE INVENTION

1. Field of the Invention

This invention relates to a device for moving a baby stroller back and forth.

2. Description of the Prior Art

Various devices are known in the art for moving a baby back and forth to quiet the baby or to put him to sleep. A representative group of U.S. Pats. disclosing such devices might include the following U.S. Pat. Nos. 2,897,518 to Paramore; 2,972,152 to Vincent; 3,022,520 to Finger; and 3,031,686 to Muzzey.

SUMMARY OF THE INVENTION

The present invention involves the providing of inexpensive, easily setup, portable means for slowly reciprocating a stroller. One embodiment of the invention might include an apparatus for use in moving a stroller having wheels, said apparatus comprising a first element having a flat upper surface, tracks mounted on said element for receiving the stroller wheels and guiding them across the flat upper surface, a motor mounted on said element, a disc coupled to said motor for rotation thereby about the axis thereof, and a connecting link extending between the stroller and the disc, said link having opposite ends one of which is connected to the stroller and the other of which is connected to the disc.

Objects of the invention are to provide apparatus for moving a stroller slowly back and forth and to provide a stroller mover which is inexpensive, portable and easily set up.

DESCRIPTION OF THE PREFERRED EMBODIMENTS

Figure 1:
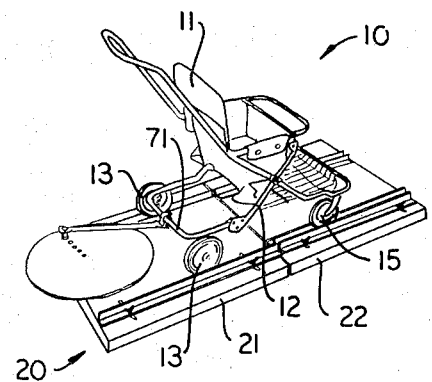
FIG. 1 is a perspective view of the stroller shown in association with the stroller mover of the present invention.
Figure 2:
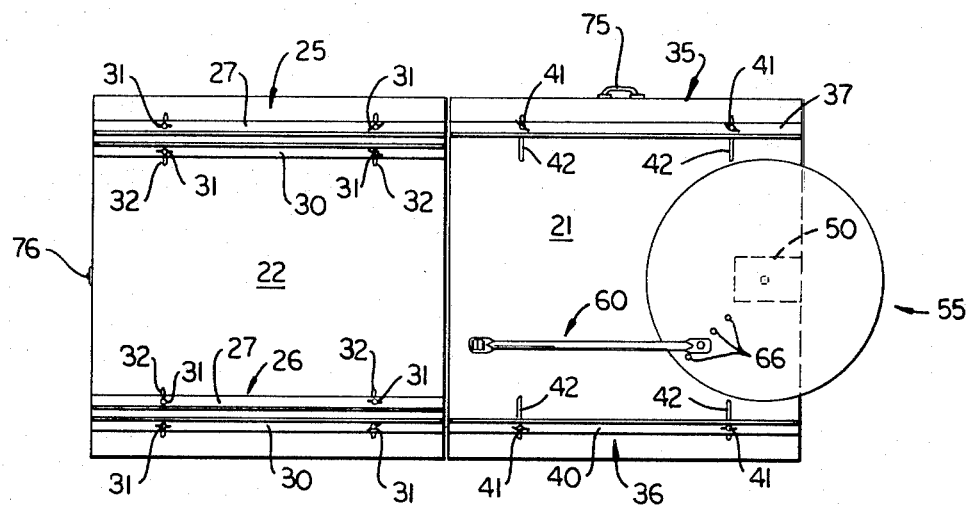
FIG. 2 is a top plan view of the stroller mover of the present invention showing it in open assembled condition.
Figure 3:
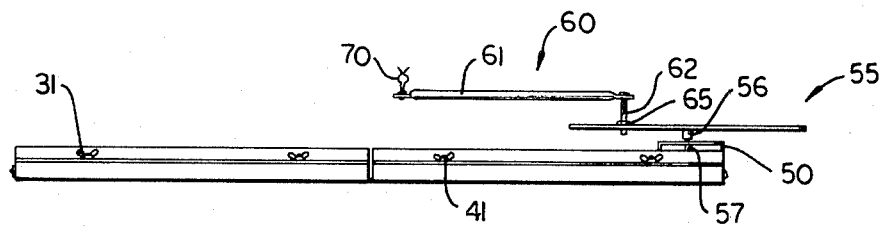
FIG. 3 is a side elevation structure of FIG. 2.

Referring now more particularly to the drawings, there is illustrated a stroller 10 which includes a seat or chair portion 11 for the baby, a frame 12, a pair of rear wheels 13 which are arranged to rotate about a fixed axis and a pair of front wheels 15 which are swivel mounted so that they can be arranged in any desired direction of pushing of the stroller. The stroller mover includes a housing 20 which includes two portions 21 and 22. The portion 22 has mounted thereon two sections 25 and 26 of track. Each of the sections 25 and 26 includes a pair of track members 27 and 30 which are secured to the portion 22 by bolts 31. The bolts 31 are received within slots 32 and are easily released and retightened by means of wingnuts making up a part of bolts 31. The bolts 31 can be adjusted so as to adjust the locations of the track members 27 and 30 depending upon the spacing of the swivel wheels 15 of the stroller. Because of the fact that the wheels swivel, two track sections 27 and 30 are provided for each of the track sections 25 and 26. The rear wheels 13 are guided by the track sections 35 and 36 each of which is made up of a single track member 37 and 40. The track members 37 and 40 are adjustable to provide for the spacing and location of the wheels 13 by releasing and reattaching the bolts 41 which are received within slots 42 in the portion 21 of the housing.

Fixedly mounted on the portion 21 of the housing is a gear-reduction-type motor 50. When the wheels of the stroller are resting on the flat upper surfaces of the portions 21 and 22 of the housing, the motor 50 rotates slowly through a geardown mechanism to move the stroller back and forth.

The motor is coupled to the stroller through a disc 55 and the link 60. The disc 55 is provided with a socket 56 which seats on an externally polygonal socket member 57. The members 56 and 57 are complementary in configuration and are easily detachable by merely lifting horizontal disc 55 upwardly away from the externally polygonal socket member 57. Of course the member 57 is connected to the drive shaft of the motor 50 through the geardown mechanism. Thus, when the motor 50 is running, the disc 55 is rotated at a relatively slow rate so that the number of rotations per minute is perhaps in a range of 6 to 10 r.p.m. The link 60 has a straight main body portion 61 and has a projection 62 extending downwardly from one end thereof. The projection 62 has a stop 65 thereon which prevents the projection 62 from extending into the openings 66 in the disc too great a distance. Thus, by permitting the projection 62 to extend into the opening 66, the disc 55 is rotatively coupled to the link 60. The link 60 has at its opposite end a pair of resilient clamping elements 70 which grip a bar 71 forming a part of the frame of the stroller and extending in parallel relation to the axis of rotation of the rear wheels 13. The link 60 can be easily detached from the stroller by merely pulling the jaws 70 in such direction that they resiliently slide off of the bar 71 of the stroller. The distance of movement of the stroller can be changed by removing the projection 65 from one of the openings 66 and placing of the projection in another opening at different radial distance from the center of rotation of the disc 55.

Figure 4:
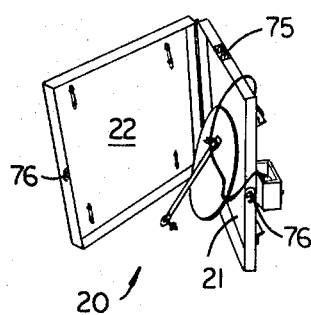
FIG. 4 is a perspective view showing the housing of the stroller mover partially closed and showing various parts of the structure disassembled and ready for packing inside the housing.

Referring to FIG. 4, the housing 20 is shown in partially folded condition. As illustrated, the housing has a handle 75 and a clamping mechanism 76. The disc can be removed from the motor as above explained by lifting upwardly and the link 60 can be removed from the disc by also lifting upwardly. The link can be disconnected from the stroller so as to allow placing of the link and the disc inside of the housing 20. When these parts are so positioned, the clamping mechanism 76 can be closed so as to prepare the housing for carrying by the handle 75.

It will be evident that the present invention provides a apparatus for moving the stroller slowly back and forth. It also provides a stroller mover which is inexpensive, portable, and easy to set up.

The invention claimed is:

1. Apparatus for use in moving a stroller having wheels, said apparatus comprising a foldable housing having a first element and a second element each having a flat upper surface, tracks adjustably mounted on said first element and said second element for receiving the stroller wheels and guiding them across said flat upper surface, a motor mounted on said first element, a disc coupled to said motor for rotation thereby about the axis thereof and a connecting link extending between the stroller and the disc, said link having opposite ends one of which is connected to the stroller and the other of which is connected to the disc, said link being removable from said disc and fittable inside said housing, said disc being removable from said motor and fittable inside said housing, and wherein said tracks comprise four sections of track, said stroller including a pair of rear wheels rotatable about a fixed axis and a pair of swivel mounted front wheels, two of said sections of track being adjustably mounted to said first element and arranged to guide said rear wheels and each including a single track member, the other two of said sections of track being adjustably mounted to said second element and arranged to guide said front wheels and each including a pair of track members positioned on the opposite sides of the respective swivel wheels, said tracks being adjustable to permit the use of different sized strollers, said housing having a handle secured to one of said elements and a mechanism clamping said first element and said second element together.

2. Apparatus as defined in claim 1 wherein said disc is coupled to said motor by means of a pair of socket members one of which has an externally polygonal configuration and the other of which is formed with an internally polygonal socket, one of said pair of members being fixed to said disc and the other to said motor, said disc being positioned above said motor whereby it is easily detachable from said motor by lifting upwardly away from said motor to separate said socket member, said link being positioned above said disc whereby it is easily detachable from said disc by lifting upwardly away from said disc.

* * * * *